United States Patent [19]

Gohrbandt

[11] Patent Number: 5,632,528
[45] Date of Patent: May 27, 1997

[54] VEHICLE WHEEL WITH TIRE

[75] Inventor: Uwe Gohrbandt, Haan, Germany

[73] Assignee: Mannesmann Aktiengesellschaft, Düsseldorf, Germany

[21] Appl. No.: 377,447

[22] Filed: Jan. 24, 1995

[30] Foreign Application Priority Data

Jan. 24, 1994 [DE] Germany .................. 44 02 296.4

[51] Int. Cl.$^6$ ..................................... B60B 21/02
[52] U.S. Cl. ..................... 301/37.22; 152/381.4
[58] Field of Search ................ 301/37.1, 37.22, 301/37.23, 38.1, 39.1; 152/379.3, 379.4, 393, 394

[56] References Cited

U.S. PATENT DOCUMENTS

| | | | |
|---|---|---|---|
| 1,435,086 | 11/1922 | Shannon | 301/37.23 X |
| 1,507,671 | 9/1924 | Greene . | |
| 2,488,864 | 11/1949 | Handy | 301/37.22 X |
| 2,573,996 | 11/1951 | Spencer | 301/37.22 |
| 3,065,995 | 11/1962 | Beacher | 301/38.1 X |
| 5,092,661 | 3/1992 | Meyers . | |

FOREIGN PATENT DOCUMENTS

| | | |
|---|---|---|
| 523344 | 1/1956 | Belgium . |
| 1068253 | 6/1954 | France . |
| 2048794 | 12/1980 | United Kingdom . |

*Primary Examiner*—Russell D. Stormer
*Attorney, Agent, or Firm*—Cohen, Pontani, Lieberman, Pavane

[57] ABSTRACT

A vehicle wheel with tire consisting of a rim and a pneumatic tire, in which an encircling disk-type ring which extends the clinch in the radial direction is arranged on the clinch that points toward the middle of the vehicle. A divided rim ring is movably arranged on the inner side of the clinch and has an inner diameter which is less than the apex of the standard shape of the rim. The free ends of the rim ring, in order to form a ring closed by positive connection in the circumferential direction, have cross-sectional forms which fit complementary to one another.

13 Claims, 6 Drawing Sheets

VEHICLE WHEEL WITH TIRE

BACKGROUND OF THE INVENTION

1. Field of the Invention

The invention relates to a vehicle wheel with a tire detachably mounted thereon. The tire has a body which is torus-shaped in cross-section and has an approximately cylindrically bearing surface and two side walls that run radially. The tire walls have a tire seat located at their ends which points toward the rim and is reinforced by non-extendable core pullers which attach the pneumatic tire between radially outwardly extending terminal clinches of the wheel. The invention further relates in particular to an encircling disk-type ring that is arranged on one of the clinches to extend the clinch in the radial direction.

2. Discussion of the Prior Art

In vehicle wheels, the pneumatic tire is currently considered the structural element which must transmit all operationally-conditioned forces from the vehicle to the street and vice versa. The efforts of manufacturers are therefore concentrated on optimizing the pneumatic tire, especially in respect to its usage characteristics, i.e., handling, rolling resistance, friction force transmission between the tire and the road, and comfort and wear, so far as possible without sacrificing the advantages and qualities already achieved.

Today, vehicle wheels of this type are known and customary in vehicles of all sorts, especially in motor vehicles and their trailers.

Recent development research has been concentrated on making improvements in the pneumatic tire, especially in the belts inserted therein. However, this concentration of development efforts in the area of belts or tread strips of known pneumatic tires used today fails to take into account the fact that the structurally reinforced "tire beads," which are radially located above the tire seating at approximately the level of the casing covers in the side walls, also contribute significantly to the rolling resistance of the tire, due to the lateral bulges brought on by the circumferential disturbance on the tire contact area.

This problem cannot be corrected or influenced by improvements in the belt. In particular, too little attention has been paid until now to the fact that the tire is only one part of the wheel system, the other part of which is the rim on which the tire is mounted.

In order to improve the usage characteristics of pneumatic tires, it is thus not sufficient to undertake modifications only in the area of the belt. Instead, the side wall areas of the pneumatic tire with the problematic tire beads and the rim must also be part of the solution.

The vehicle tire would thus need to have a rim which not only serves as a mount for the pneumatic tire, but also performs precisely defined support functions for the mounted tire.

In order to meet the requirements mentioned above, a vehicle wheel with tire has been proposed with a rotatably-mounted rim with terminal clinches which extend radially outward, in which at least one of the clinches is of greater radial length.

The elongation extends at least into approximately the central area of the side wall in question of the pneumatic tire and runs, in its radial extension, more steeply—i.e., is inclined more to the inside—than the natural bending contour of the tire side wall, which is under internal pressure. Preferably, the lengthened clinch is located on the side of the wheel which faces the vehicle. This proposal has the disadvantage that a wheel manufactured in this manner deviates from the norm, so that retrofitting vehicles already approved would entail an exchange of wheels involving corresponding expense. In addition, mounting the pneumatic tire is made more difficult, because in many wheel designs the clinch located on the vehicle exterior has a larger outer diameter than the interior clinch. In no case is it possible to draw the tire on over the lengthened clinch. A further disadvantage is that in order to make adjustments to meet different requirements related to steering behavior and driving comport, it is necessary to manufacture a new wheel, since the length of the elongation as well as the inclination of the lengthened clinch to the wheel axis have a decisive influence on driving behavior.

In an alternative proposal, an encircling disk-type metal ring is clamped or shrunk on the clinch in order to lengthen the clinch. Mounting such a ring is very expensive, since doing so requires heating the ring and cooling the rim. In addition, there is a danger that the shrink joint will be loosened by the elastic flexing of the wheel. This is also true for the clamp connection. A further disadvantage is that the amount of positive-locking support for the ring on the clinch is sharply limited by the small mounting-conditioned diameter difference attainable between the inner diameter of the ring and the outer diameter of the clinch.

SUMMARY OF THE INVENTION

The object of the present invention is to provide a vehicle wheel which, while avoiding the above-described disadvantages, can be simply adapted to meet different requirements and is both simpler and more economical to manufacture.

Pursuant to this object, and others which will become apparent hereafter, one aspect of the present invention resides in a divided rim ring removably arranged on an inner side of the clinch of the vehicle wheel. The rim ring has an inner diameter smaller than the apex diameter of the standard shape of the rim. The free ends of the rim ring pieces each have a complimentary cross-sectional form so that two rim ring pieces can be connected together in a positive-locking manner in the circumferential direction to form a closed ring.

Pursuant to a further embodiment of the invention, the inner end of the rim ring has a contour that conforms to the clinch area of the wheel so that the rim ring comes to rest centered on the clinch when the pneumatic tire is inflated. The inner end area of the rim ring can have a contour which corresponds to either a transition segment between the clinch and the tire seating area of the wheel, or to an interior contour of the clinch.

It is also possible to round off the radially outward end of the rim ring. Alternatively, the radially outward end can be bent outwardly to form a clinch.

In yet a further embodiment, a contoured auxiliary ring that inclines outwardly is mounted on the radially outward end of the rim ring.

Still another embodiment of the invention provides a covering ring arranged between the clinch of the wheel and the rim ring.

The advantage of the non-attached arrangement of a divided rim ring on the inner side of the clinch is that wheels which are available on the market can be retrofitted at any time, because no structural changes of any kind must be undertaken on the wheel itself. Starting from standardized wheels, individualized adaptations are possible at low cost for every model. In contrast to the known prior art, no sealable joint is needed; rather, it suffices that the free ends of the rim rings, seen in the circumferential direction, can be positively connected for the purpose of absorbing the tractive forces. The fixing in place in the axial direction is done by means of the inflated pneumatic tire, which presses the non-attached rim ring via a part of the radial extension onto the inner side of the clinch. The positive connection serves exclusively for the transmission of tractive forces and can be established in various ways, for example, through cross-sectional forms located at the free ends, which resemble two individual elements of a puzzle that can be fit together. To prevent the recess from becoming too large in respect to the forces to be transmitted, several connections of the same type can be provided in the separation area. The essential advantage of the proposed rim ring is that mounting is easier, without limitations being placed on the function of supporting the pneumatic tire. Additionally, no special tools are required, so that mounting can be carried out by any mechanic in a tire shop. In connection with this, it does not matter whether the pneumatic tire has already been drawn on to the rim or not.

In addition, the material used for the rim ring can be freely selected from a broad spectrum, allowing metal as well as non-metal materials to be used. In the case of large truck wheels, due to the forces and bending moments to be transmitted, a rim ring made of steel will be chosen, but a hardenable light metal material as well as, for example, a fiber-reinforced plastic can also be used. The last-mentioned material would not only have the advantage of low weight, but also that of avoiding contact corrosion.

The height of the rim ring and its inclination in respect to the wheel axis, along with the curve of the long axis of the cross-sectional area, substantially determine the desired support of the tire side wall and thus the improvement in usage characteristics of a vehicle wheel produced in this manner. The range of variation is very wide, so that the individual setting of all intermediate stages is possible in respect to more or less sporty steering behavior and more or less driving comfort. It is even possible to exchange one rim ring for another in the event that different handling is desired after a certain number of driving miles.

The application area includes wheels for automobiles as well as for utility vehicles. The arrangement of the rim ring according to the invention is suitable for steel wheels as well as for wheels of light metal or alloy. The inner end area of the rim ring has a contour, so that after the pneumatic tire is inflated, the rim ring comes to rest in a centered fashion on the inner side of the clinch.

One possibility is to conform the contour to the transition segment between the clinch and the tire seating area. Alternatively, the contour can also be conformed to the interior clinch contour.

The inner diameter of the rim ring can be in a range limited at its lower end by the diameter of the tire seating area and at its upper end by the corresponding maximum possible small diameter difference, according to the prior art, at a shrink joint. Due to the larger diameter difference that can be bridged, the non-attached divided rim ring according to the invention permits a considerably longer support area for the supported rim ring to be achieved. Preferably, the inner diameter of the rim ring will be in the area of the rim vertex, because in this case the support is particularly effective. The imaginary rim vertex is determined by the point of intersection between the imaginary extension of the tire seating area and the imaginary extension of the clinch contour. The cross-sectional area of the rim ring may be straight, may have different inclinations by section, or may be continuously curved. This is a question of making fine adjustments based on the particular tire type being used, so as to have the side wall of the pneumatic tire conform as flawlessly as possible to the rim ring.

In principle, the rim ring according to the invention can be arranged on every rim wall side; preferably, however, it is arranged on the side facing the vehicle. In the case of truck wheels in twin arrangement, the rim ring for the outer wheel is arranged on the clinch pointing to the key side, and the rim ring for the structurally similar inner wheel and the front wheel is arranged on the other clinch. The advantage here is that there is only one type of rim and rim ring, respectively, so that warehousing is minimized.

The manufacture of the rim ring according to the invention is simple and can largely be carried out with available devices. The starting material is preferably a continuous sheet metal strip, either flat or pre-shaped. This strip is cut to length and curled. Optionally, the desired cross-sectional configuration is created at the free end on the open or previously welded-together ring. A stamping process or cutting process, e.g., with a laser or water jet, may be used for this purpose. To ensure that the rim ring, in the event of prior welding, comes to rest snugly on both the side wall of the tire and the clinch, the welded seam area on both sides must be cleaned, i.e., cleaned to sheet-metal flatness.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
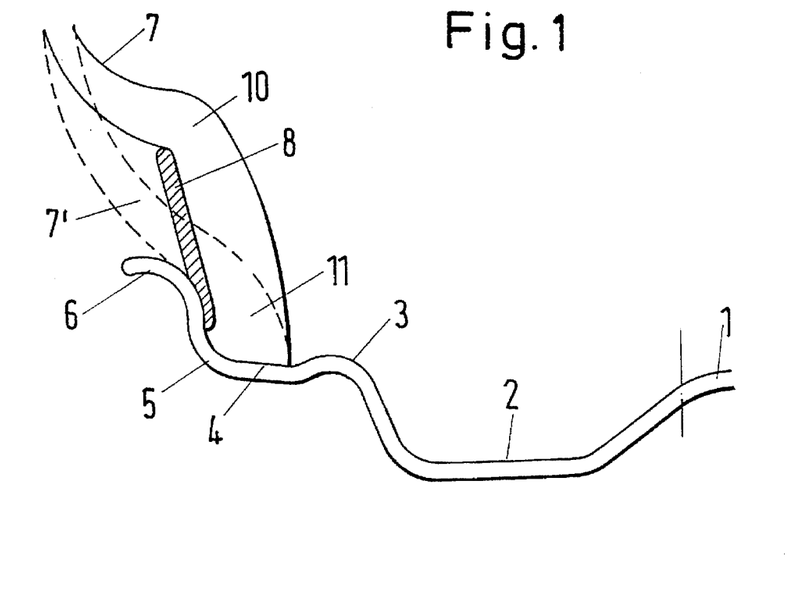
FIG. 1 shows half of a cross-section through a vehicle wheel according to the invention.
Figure 2:
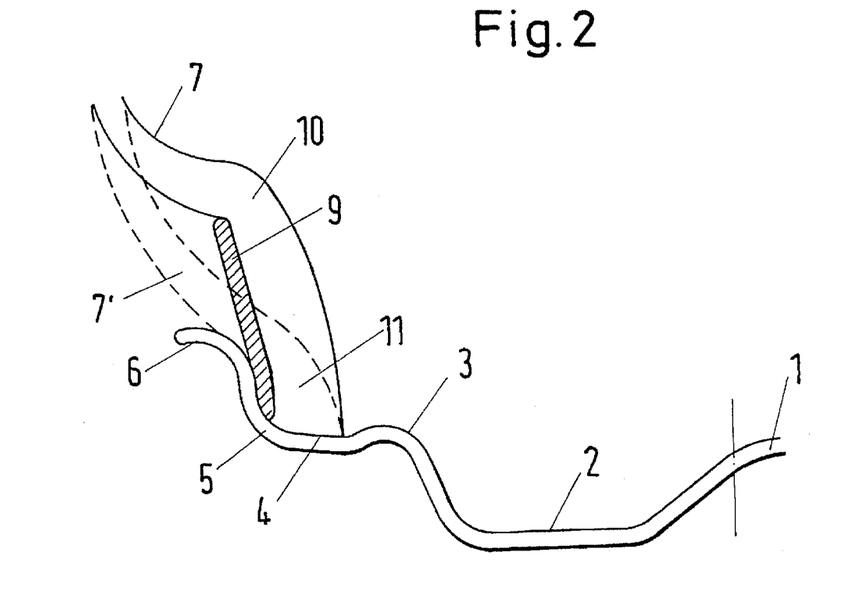
FIG. 2 is a view similar to FIG. 1, but with a different design form of the rim ring.

FIGS. 1 and 2 show a cross-section of a vehicle wheel with two different design forms of the rim ring according to the invention. These figures show only half of the cross-section of the inventive wheel.

Figure 3A:
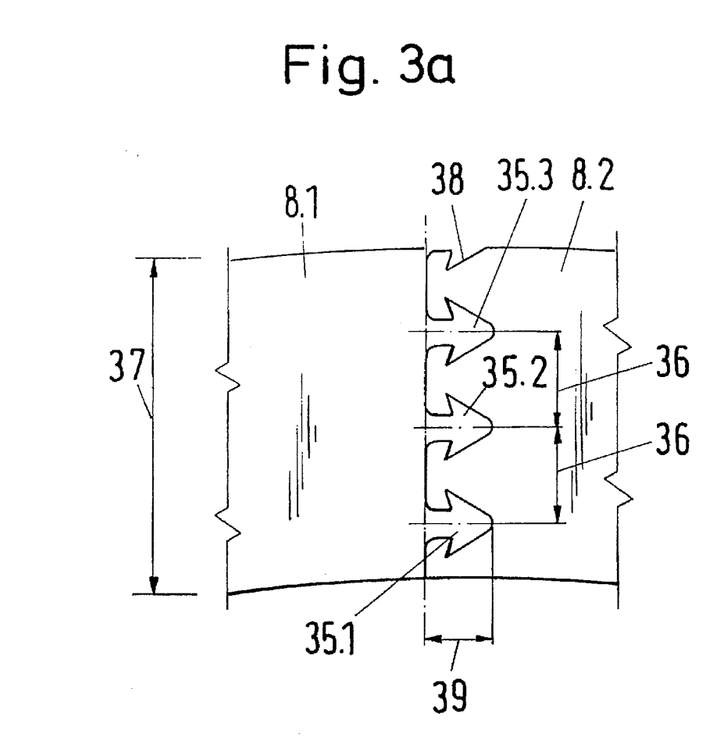
FIG. 3a,b how an enlarged top view of the separation area after mounting.
Figure 3B:
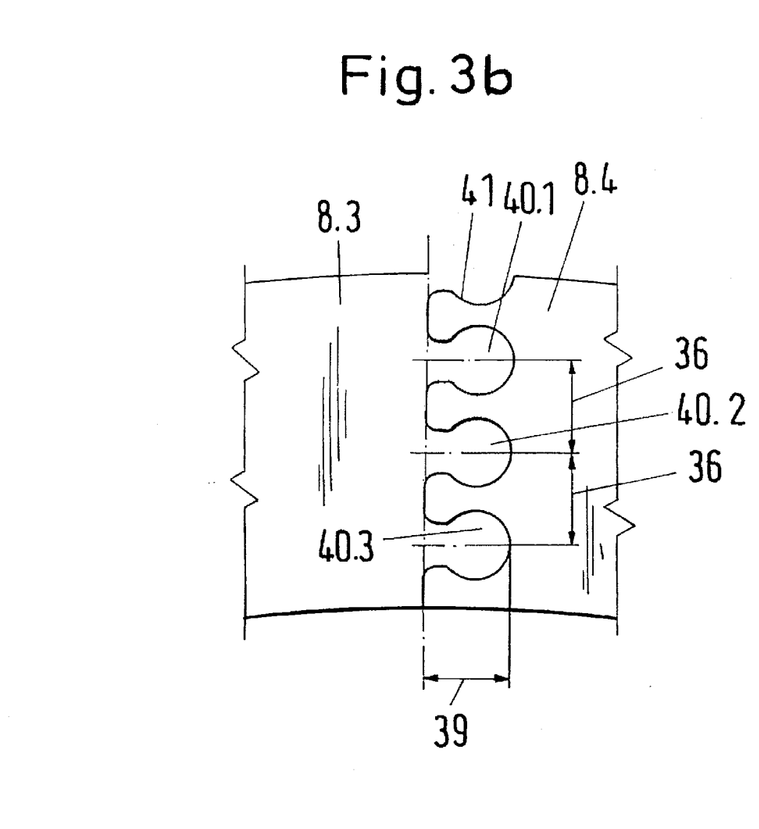
Figure 4:
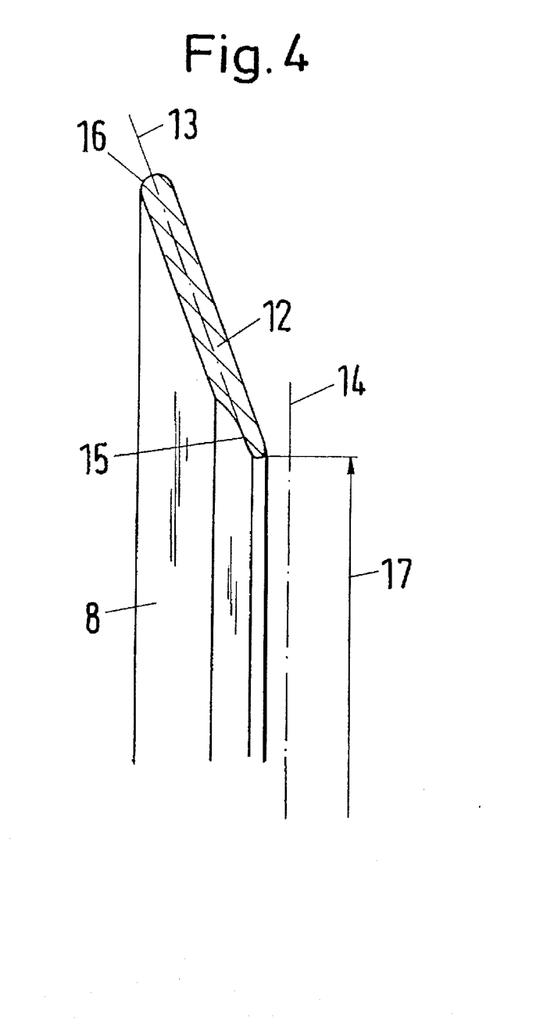
FIG. 4 is a section of a rim ring design according to FIG. 1 before mounting.
Figure 5:
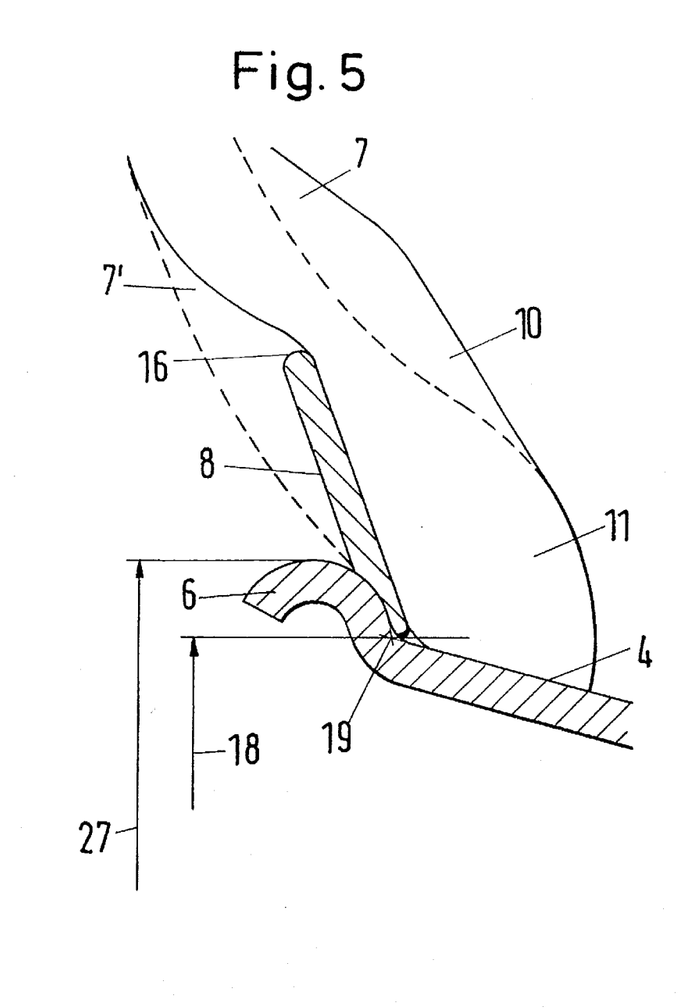
FIG. 5 is an enlarged section of the design according to FIGS. 1 and 4.

The rim 1 has a well 2, a hump 3 and a tire seating area 4 which runs at a slant toward the outside. Attached thereto is one of two terminal clinches 6 extending radially to the outside with a transition segment 5. The dotted lines indicate the seat of the pneumatic tire 7' without a rim ring 8, 9 according to the invention. In FIG. 1 as well as in FIG. 2, it can be seen, after inflation of the pneumatic tire, how the respective rim rings 8, 9 come to rest on the inner side of the clinch 6. Details of this are shown in FIGS. 3 to 5. The rim ring 8, 9 extends in the radial direction into the area of the side wall 10 of the pneumatic tire 7. Details of the tire seating 11 are not shown here. In FIGS. 1 and 2, it can clearly be seen that the tire side wall 10 is pressed more to the inside by the rim ring 8, 9 and is thus prestressed in comparison to the natural bending contour (dotted line) of the tire 7'.

The two rim rings 8, 9 shown in FIGS. 1 and 2 differ in that in the design according to FIG. 1 the longitudinal axis of the cross-sectional area runs in a straight line. In FIG. 2, on the other hand, the longitudinal axis of the cross-sectional area has two sections with different inclinations, whereby the section above the clinch 6 inclines somewhat more to the outside. This kink can be used as an adjustment parameter in modifying the characteristic data for the usage characteristics of the vehicle wheel.

In a top view in enlarged scale, FIGS. 3a,b show the separation area of the rim ring according to the invention after mounting. The divided rim ring 8 according to the design in FIG. 1 has two free ends 8.1; 8.2 or 8.3; 8.4, which are designed in such a way that, seen in the circumferential direction, they form a positive connection which is able to transmit tractive forces. For example, the free end 8.1 on the left (FIG. 3a) is provided with Christmas-tree-shaped prolongations 35.1–35.3, which extend, spaced at a distance 36 from one another, across the entire breadth 37 of the rim ring 8. To permit establishment of a positive connection, the opposite free end 8.2 is provided with recesses 38 complementary to the prolongations 35.1 to 35.3. The circumferential extension 39 of the prolongations 35.1–35.3 or the recess 38 is a question of utility and ease of manufacture. FIG. 3b shows a comparable separation area, the sole difference being that the prolongations 40.1 to 40.3 and the associated recesses 41 have a different design.

It is not practically feasible to depict the great number of possible embodiments of the separation area. What is essential is simply that the interlocking of the two free ends 8.1; 8.2 and 8.3; 8.4 results in a positive connection in the circumferential direction. In the simplest case, a prolongation 35.2 and an associated recess 38 are sufficient for this. In any case, the axial fixing in place of the two free ends 8.1; 8.2 and 8.3; 8.4 is carried out by means of the inflated pneumatic tire 7, which presses the rim ring 8, 9 (as shown in FIGS. 1 and 2) onto the inner side of the clinch 6 via a part of the radial extension. Even when the tires are almost empty of air, i.e. almost "flat", the connection is maintained through the fixing in place of the tire foot 11 on the hump 3.

FIG. 4 shows in section and FIG. 5 shows in enlarged scale the design form of the rim ring 8 as in FIG. 1. For the sake of clarity, the longitudinal axis 13 is drawn into the cross-sectional area 12. For comparison to this, the position of the solder 14 on the wheel axis is shown. This makes clear the fact that the cross-sectional area 12 of the rim ring 8 is located not on the solder plane, but rather at an angle thereto. The inner end area of the rim ring 8 has a contour 15. This contour 15 is designed so that it corresponds to the interior contour of the clinch 6. The contour area 15, located radially outward, of the rim ring 8 is rounded, so that the side wall 10 of the pneumatic tire 7 is not affected by the flexing activity or, in other words, so that a tolerable transition is achieved at this point. It has already been noted in the description that the inner diameter of the rim ring can cover a certain area. In the example shown here, the smallest inner diameter 17 of the rim ring 8 preferably lies in the area of the rim vertex 19. Expressed with precision, the inner diameter 17 is smaller than the apex diameter 27, and generally lies somewhat above the radius or the diameter 18 of the rim vertex 19. A larger inner diameter 17 may also be chosen, but to the same extent that this is done, the supportive effect of the support surface of the rim ring on the clinch 6 will be diminished. The imaginary rim vertex 19 is the intersection of the imaginary extension of the tire seating area 4 and the imaginary extension of the inner contour of the clinch 6.

Figure 6A:
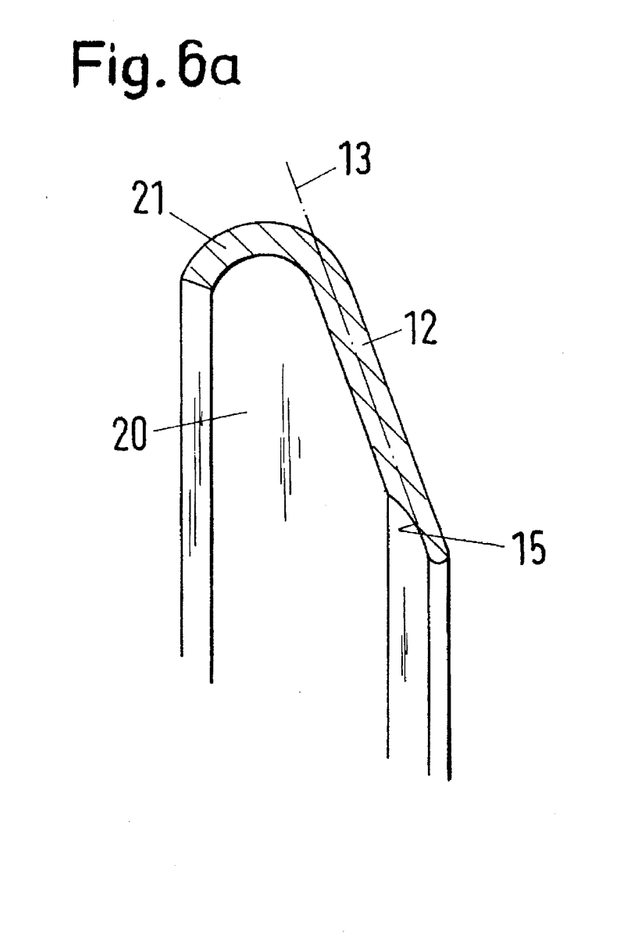
FIG. 6a,b are views similar to FIGS. 4 and 5, but with a different design of the rim ring.
Figure 6B:
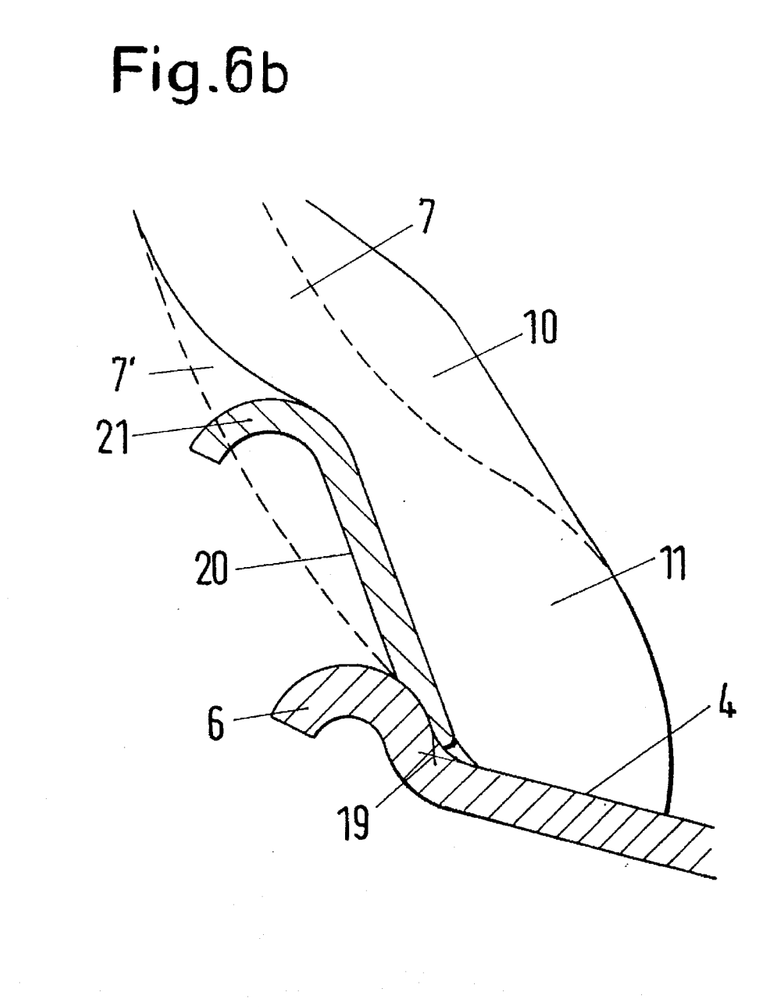

FIGS. 6a,b show a depiction comparable to that in FIGS. 4 and 5; however, with a different design form of a rim ring 20. In contrast to the depiction in FIG. 4, the area located radially outward of the rim ring 20 is bent to the outside 21, like a clinch. It can clearly be seen that the snug fit of the pneumatic tire 7 is thus achieved in a rounded fashion and kinks and edges are avoided.

Figure 7A:
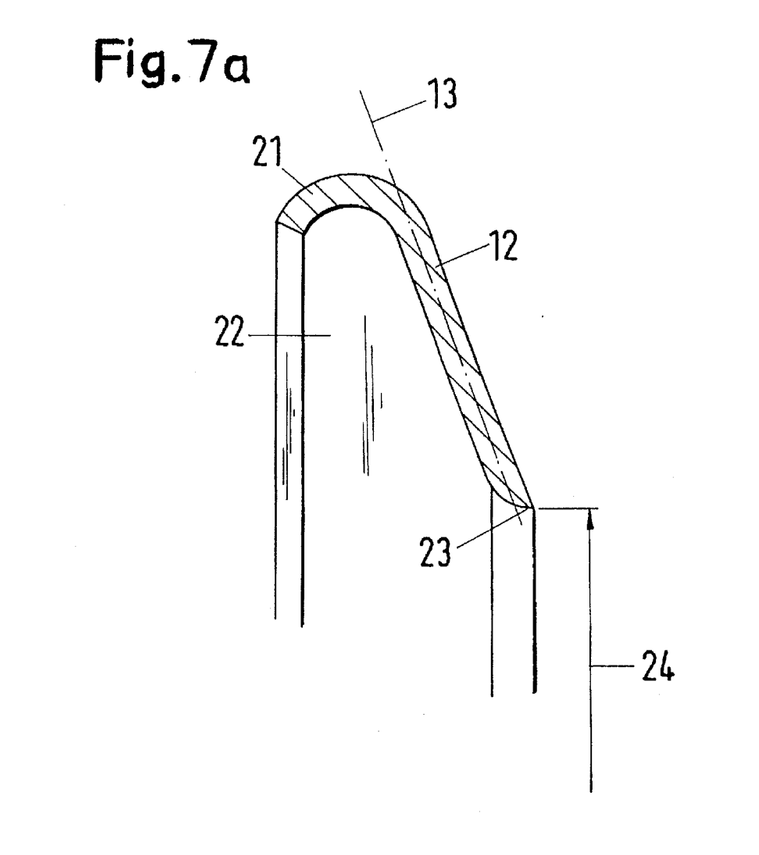
FIGS. 7a,b are views similar to FIGS. 6a,b but with a further design of the rim ring.
Figure 7B:
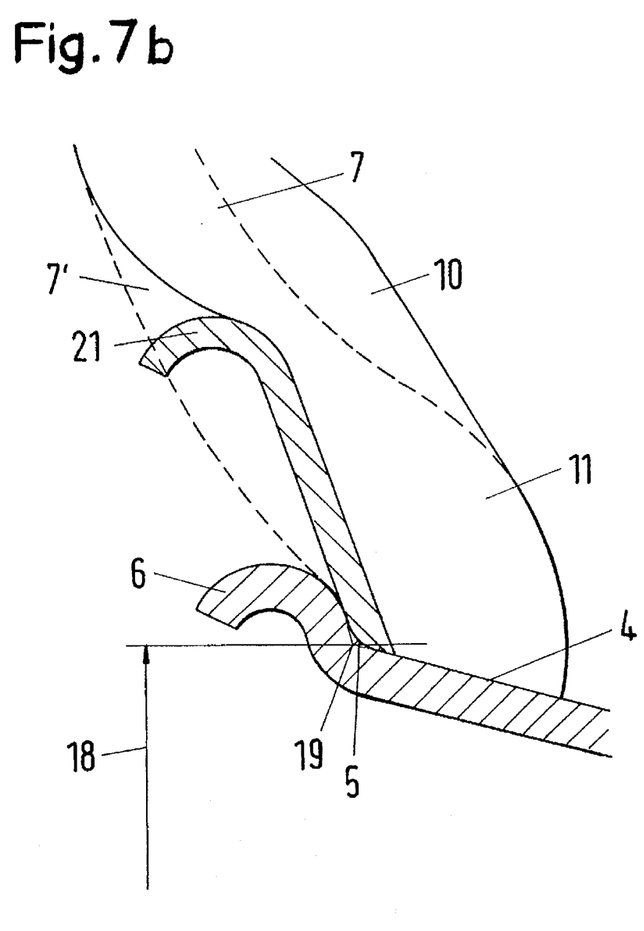

FIGS. 7a,b show a further embodiment of a rim ring 22. In contrast to FIGS. 6a,b, the inner end area 23 here has a different design. The contour of this end area 23 corresponds to the contour of the transition segment 5 between the tire seating area 4 and the clinch 6. In this case, the inner end area 23 of the rim ring 22 can slip under the rim vertex 19, so that the inner diameter 24 of the rim ring 22 is smaller than the diameter 18 of the rim vertex 19. This design also marks the lower limit of the inner diameter 24 of the rim ring 22. Taking into account the manufacturing tolerances for the rim and the rim ring, the smallest possible inner diameter 24 of the rim ring 22 should always be somewhat larger than the outer diameter of the tire seating area 4 at this point. If the selected inner diameter 24 is too small, then the rim ring 22 will no longer be moveable after assembly and centering the rim ring 22 after the inflation of the pneumatic tire 7 will not be possible and/or the rim ring 22, seen in the circumferential direction, will be supported only at certain points.

Figure 8:
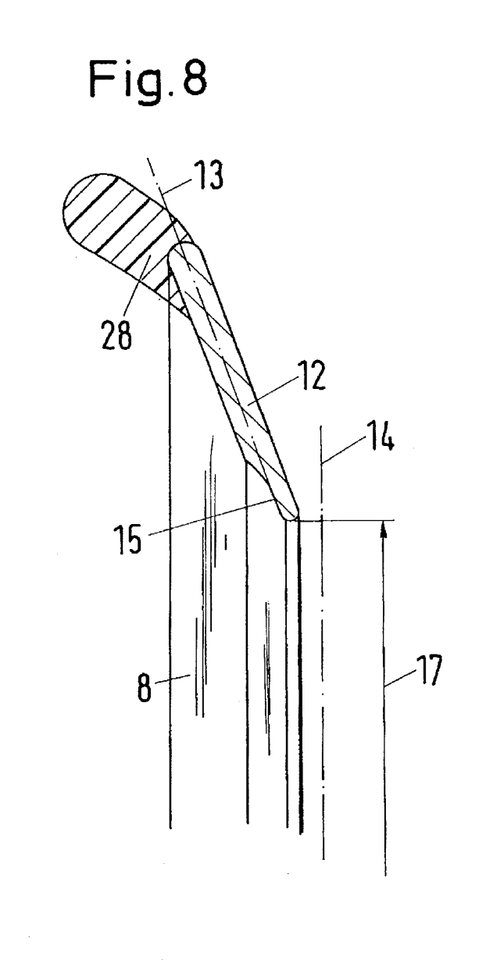
FIG. 8 is a view similar to FIG. 4, but with an auxiliary ring.

FIG. 8 shows a rim ring 8 comparable to that in FIG. 4; however, with an auxiliary ring 28, which is arranged on areas which lie radially outward. This auxiliary ring 28 is an alternative to a rim ring 20 with a bent end 21, as shown, for example, in FIG. 6a. This auxiliary ring 28 is preferably manufactured from a plastic material and is, for example, vulcanized or adhered onto the rim ring 8. The advantage of this alternative is that the rim ring 8 is easy to manufacture compared to the rim ring 20 with a bent end 21. The auxiliary ring 28 conforms well, because of its flexibility, to the tire side wall 10 and ensures a tolerable transition of the different rigidities.

Figure 9:
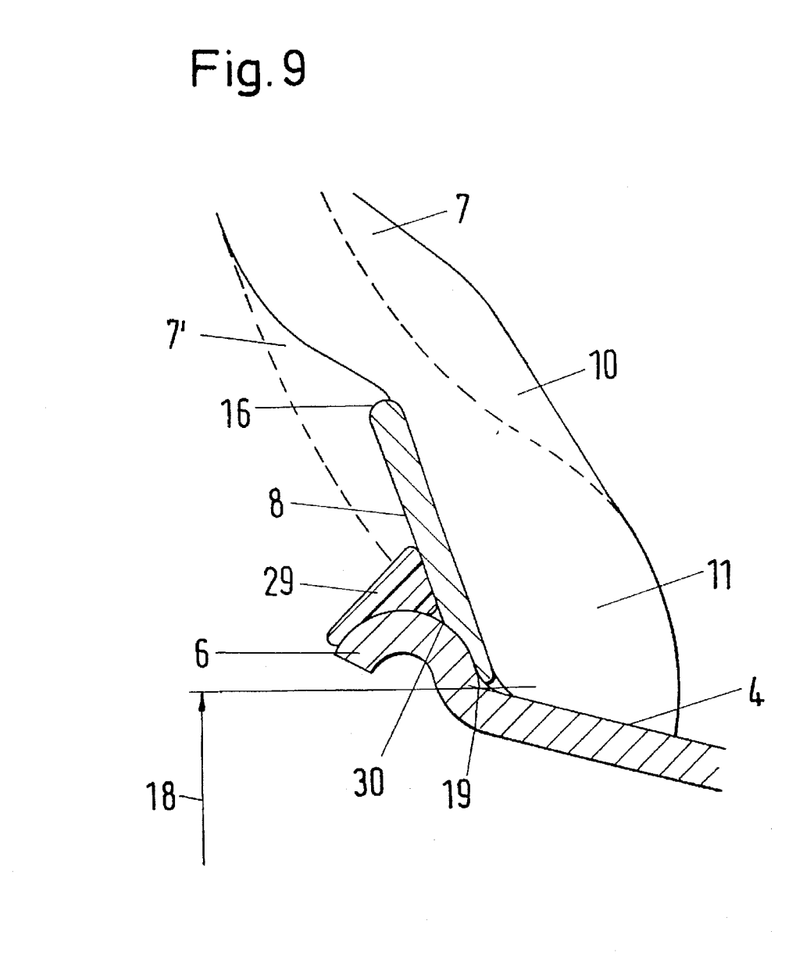
FIG. 9 is a view similar to FIG. 5, but with a covering ring.

FIG. 9 shows the arrangement of a covering ring 29 in the let-in area between the clinch 6 and the rim ring 8. This covering ring 29, which is made optionally of plastic or rubber, ensures, first of all, that the gap 30, which breathes during driving operation, is neatly covered. This is important in respect to avoiding possible gap corrosion. In addition, the covering ring 29 reinforces the support function of the rim ring 8, because it creates a resistance when the rim ring 8 is pressed elastically outward by the flexing pneumatic tire 7 during driving operation. The protection of the rim ring 8 against corrosion can also be improved by providing the rim ring with a lacquer or rubber coating.

The invention is not limited by the embodiments described above which are presented as examples only but can be modified in various ways within the scope of protection defined by the appended patent claims.

I claim:

1. A combination of a vehicle wheel and a pneumatic tire, the combination comprising: a wheel having an apex diameter and an inner side and an outer side each having a radially outwardly extending terminal clinch; a tire having sidewalls with inwardly directed annular regions that form a tire seat, the walls of the tire being removably mounted between the clinches of the wheel and defining a natural contour when mounted; and a split rim ring removably arranged between an inner side of one of the clinches of the wheel and the tire sidewall of the tire so as to be angled outwardly at an angle steeper than the natural contour of the tire and to extend the clinch in a radial direction, whereby the rim ring prestresses and inhibits outward bulging of the sidewall of the tire, the rim ring having an inner diameter that is smaller than the apex diameter of the wheel, the split rim ring having two free ends at which complimentary shaped projections are provided whereby the ends are connected together in a positive-locking manner to form the ring.

2. A combination as defined in claim 1, wherein the rim ring is formed of two pieces.

3. A combination as defined in claim 1, wherein the projections at the ends of the ring are of a common design.

4. A combination as defined in claim 3, wherein the rim ring has a radially inner region that is contoured to conform to the clinch so that the rim ring is centered on the clinch when the tire is inflated.

5. A combination as defined in claim 3, wherein the wheel has a tire seating area that adjoins the clinch by a transition segment, the radially inner region of the rim ring having a contour which corresponds to the transition segment between the clinch and the tire seating area.

6. A combination as defined in claim 3, wherein the clinch has an interior contour, the radially inner region of the rim ring having a contour that corresponds to an interior contour of the clinch.

7. A combination as defined in claim 1, wherein the rim ring has a radially outer periphery that is rounded off.

8. A combination as defined in claim 1, wherein the rim ring has a radially outer periphery that is bent outwardly to form a clinch.

9. A combination as defined in claim 1, and further comprising a contoured auxiliary ring mounted on a radially outer periphery of the rim ring so as to be outwardly inclined.

10. A combination as defined in claim 1, and further comprising a covering ring arranged between the clinch and the rim ring.

11. A combination as defined in claim 1, wherein the rim ring is made of a metal.

12. A combination as defined in claim 1, wherein the rim ring is made of a fiber-reinforced plastic.

13. A combination as defined in claim 1, wherein the rim ring is arranged between the inner side of the clinch of the inner side of the wheel and the side wall of the tire.

* * * * *